US008869236B1

(12) United States Patent
Tonogai et al.

(10) Patent No.: US 8,869,236 B1
(45) Date of Patent: Oct. 21, 2014

(54) AUTOMATIC CONFIGURATION OF A NETWORK DEVICE

(71) Applicant: ShoreTel, Inc., Sunnyvale, CA (US)

(72) Inventors: Dale Tonogai, Los Altos, CA (US); Darren J. Croke, Durango, CO (US)

(73) Assignee: Shoretel, Inc., Sunnyvale, CA (US)

( * ) Notice: Subject to any disclaimer, the term of this patent is extended or adjusted under 35 U.S.C. 154(b) by 0 days.

(21) Appl. No.: 13/739,371

(22) Filed: Jan. 11, 2013

(51) Int. Cl.
G06F 21/00 (2013.01)
H04L 12/24 (2006.01)
H04L 29/06 (2006.01)

(52) U.S. Cl.
CPC .............. *H04L 41/082* (2013.01); *H04L 63/08* (2013.01)
USPC ........ 726/1; 726/7; 726/12; 726/15; 713/153; 709/224

(58) Field of Classification Search
CPC .................................................. H04L 41/0806
USPC .......................................... 726/3, 1; 713/153
See application file for complete search history.

(56) References Cited

U.S. PATENT DOCUMENTS

| | | | | |
|---|---|---|---|---|
| 7,120,679 B2 * | 10/2006 | Remer | ........................... | 709/220 |
| 7,356,136 B2 * | 4/2008 | Eshun et al. | ............... | 379/201.12 |
| 7,373,661 B2 | 5/2008 | Smith et al. | | |
| 7,885,207 B2 | 2/2011 | Sarkar et al. | | |
| 8,089,953 B2 * | 1/2012 | Angelot et al. | ................ | 370/351 |
| 8,156,207 B2 * | 4/2012 | Wood et al. | ..................... | 709/221 |
| 2003/0140132 A1 * | 7/2003 | Champagne et al. | ......... | 709/223 |
| 2006/0031427 A1 * | 2/2006 | Jain et al. | ........................ | 709/220 |
| 2006/0080425 A1 * | 4/2006 | Wood et al. | ..................... | 709/223 |
| 2006/0104220 A1 * | 5/2006 | Yamazaki et al. | ............. | 370/254 |
| 2006/0236095 A1 * | 10/2006 | Smith et al. | ..................... | 713/153 |
| 2007/0011301 A1 * | 1/2007 | Ong et al. | ...................... | 709/224 |
| 2008/0065767 A1 * | 3/2008 | Stachura et al. | ............... | 709/224 |
| 2008/0148386 A1 * | 6/2008 | Kreuk | .............. | 726/15 |
| 2010/0030875 A1 * | 2/2010 | Visser et al. | ................... | 709/220 |
| 2010/0064032 A1 * | 3/2010 | Vinel et al. | ..................... | 709/220 |
| 2010/0281143 A1 * | 11/2010 | Krahn et al. | .................... | 709/221 |
| 2011/0010383 A1 * | 1/2011 | Thompson et al. | ........... | 707/769 |
| 2011/0261946 A1 * | 10/2011 | Conroy et al. | ................. | 379/242 |
| 2012/0311458 A1 * | 12/2012 | Wolff-Petersen et al. | ..... | 715/744 |
| 2012/0311659 A1 * | 12/2012 | Narain et al. | ...................... | 726/1 |
| 2013/0067550 A1 * | 3/2013 | Chen et al. | .......................... | 726/7 |
| 2013/0238769 A1 * | 9/2013 | Asati et al. | ..................... | 709/220 |

* cited by examiner

*Primary Examiner* — Morshed Mehedi
(74) *Attorney, Agent, or Firm* — Tarolli, Sundheim, Covell & Tummino LLP

(57) ABSTRACT

One embodiment includes a non-transitory computer readable medium having instructions executable by a processor to implement a method. The method includes receiving user configuration data for a network device, the configuration system being coupled to a service network. The method also includes storing device configuration data in a configuration database coupled to the service network, the device configuration data being based on the user configuration data and service network data. The method also includes receiving a configuration request at the configuration system from the network device in response to the network device being unconfigured and connected in a user network. The method further includes transmitting the device configuration data from the configuration database to the network device in response to the configuration request.

24 Claims, 4 Drawing Sheets

US 8,869,236 B1

AUTOMATIC CONFIGURATION OF A NETWORK DEVICE

TECHNICAL FIELD

This disclosure relates generally to automatic configuration of a network device.

BACKGROUND

A variety of computing devices can be considered "headless devices", in that they include no direct user interface with which a user can access and/or configure the device. As an example, network routers or access points can be configured as headless devices. To configure these or other headless devices, a user typically is required to plug a communication cable into the headless device to access and/or provide configuration parameters to the device. In other examples, a user can be required to access the headless device over a network connection after coupling the headless device to the network.

SUMMARY

This disclosure relates generally to the automatic configuration of a network device, such as to enable plug-and-play installation thereof.

One example includes a non-transitory computer readable medium having instructions executable by a processor to implement a method. The method includes receiving user configuration data for a network device at a configuration system that is coupled to a service network. The method also includes storing device configuration data in a configuration database coupled to the service network, the device configuration data being based on the user configuration data and service network data. The method also includes receiving a configuration request at the configuration system from the network device in response to the network device being unconfigured and connected in a user network. The method further includes transmitting the device configuration data from the configuration database to the network device in response to the configuration request.

Another example includes a non-transitory computer readable medium having instructions executable by a processor to implement a method. The method includes determining at the network device a need to configure the network device for operation on a user network. The method also includes transmitting a configuration request to a configuration system that is coupled to a service network in response to determining the need to configure the network device. The method further includes receiving device configuration data at the network device from a configuration database associated with the configuration system in response to the configuration request for configuring the network device. The device configuration data can include user configuration data for operating the network device in the user network and service network data for operating the network device in the service network.

Another example includes a network system. The system includes a given network device that is coupled to a user network. The system further includes a configuration system coupled to a service network, the configuration system comprising a configuration database configured to store device configuration data for each of a plurality of network devices. The device configuration data for the given network device including user configuration data for the network device that is provided in response to an authorized user input associated with the user network, and service network data for operating the network device in the service network. The configuration system can be further configured to transmit the device configuration data from the configuration database to the network device for configuring the network device automatically in response to a configuration request from the network device upon the network device being in an unconfigured state while coupled to the user network.

DETAILED DESCRIPTION

Figure 1:
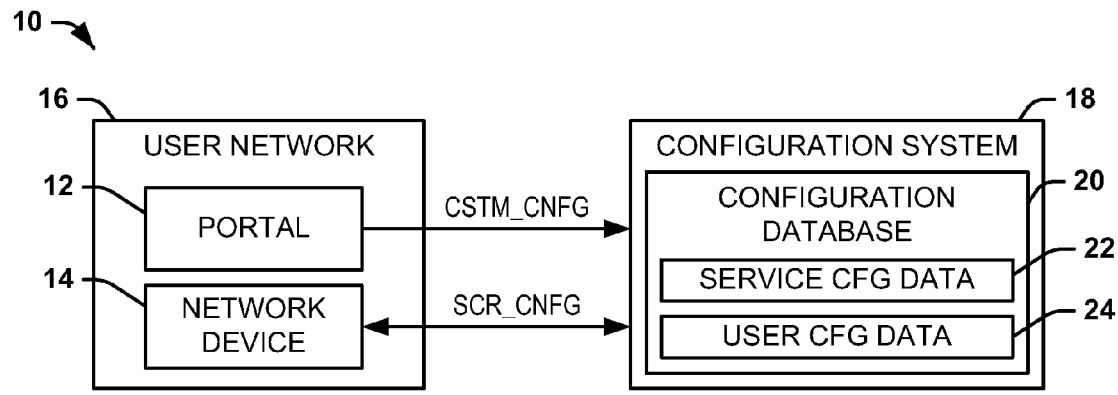
FIG. 1 illustrates an example of a network system.

This disclosure relates generally to the automatic configuration of a network device, such as to allow plug-and-play installation. As described herein, "automatic configuration" and "plug-and-play installation" are terms used to describe configuration of a network device that can occur in response to coupling the network device to the network without any subsequent provision of configuration information by the user. For example, an unconfigured network device can automatically obtain configuration information in response to being connected to a user network. The network device can be unconfigured initially or it may become unconfigured during operation, such as if some or all of the configuration information changes or the device is otherwise unable to communicate with a configuration system that maintains and provides the configuration data to the network device. In some examples, the network device can be a headless device that is implemented for use in a cloud computing system, such as can be referred to as a cloud access router (CAR). The CAR can be configured to access cloud resources of a computing system, such as telecommunication resources implemented in the cloud.

A user can provide user configuration data at one or more stages, such as during an order process as well as before and/or after provisioning of the network device. As used herein, the user can be an authorized person or machine that is associated with a user network in which the network device is connected. For example, the user can be an administrator of the user network, such that the entity associated with the user network can be a customer of services provided via the service network, which is facilitated by utilizing the configuration system. The user configuration data can include fixed and mutable data sets. As an example, the fixed data can include customer specifications that are implemented by an associated service provider, including before and during provisioning of the network device. The mutable user configuration data can include operational parameters associated with the headless device with respect to the network. For example, the mutable user configuration data can include data identifying one or more resources on the user network (e.g., a local area network (LAN)) in which the network device is deployed. The mutable configuration data can also include parameters associated with the desired performance of the network device.

The network system can include a configuration system, such as hosted at one or more servers on a service network. In some examples, the user configuration data can be provided via a user interface, such as at a portal coupled to the user network, which accesses a configuration website that is hosted at the one or more servers on the service network. Each user network can access the configuration system via a similar type of portal. The configuration system can include a configuration database that is configured to store the device configuration information for any number of one or more network devices, which can reside in any number of one or more user networks. The device configuration data for a given user device includes the user configuration data and service network data—both of which can include fixed and mutable data. The service network data can be provided, for example, by the service provider.

As a further example, in response to an unconfigured network device being connected to the user network, the network device can establish a network connection, such as a secure connection, to the configuration system. The configuration system can provide the device configuration data to the network device based on the user configuration data and the service network data for such device. For example, the network device can be configured automatically in response to being coupled to the user network without any subsequent involvement by a user. Additionally, should the device configuration data change, such as mutable user configuration data or mutable service network data, the updated configuration data can be provided to the network device.

FIG. 1 illustrates an example of a network system 10. As an example, the network system 10 can include multiple devices that are networked together across one or more separate networks, such as including a cloud computing system. The network system 10 includes a portal 12 and a network device 14 that can reside on a user network 16, such as an enterprise LAN. The portal 12 can be implemented in a computer system (e.g., an enterprise server, personal computer, or hand-held wireless device) that includes or provides a user interface. While the portal 12 is demonstrated as residing in the user network 16, it is to be understood that the portal 12 can be located at and coupled to another network, such as can correspond to any interface configured to provide the configuration data. As another example, the network device 14 can be configured as a headless network device, such as a network router (e.g., a cloud access router) that is to be installed in the user network 16. The network system 10 can thus enable an automatic configuration of the network device 14, such as connected in the user network 16.

The network system 10 also includes a configuration system 18. As an example, the configuration system 18 can be configured as a set of one or more servers that form a service network. Such service network can be provided by a service provider (e.g., as a cloud computing infrastructure) and be accessible from one or more LAN or wide area networks (WANs), such as the internet. The configuration system 18 includes a configuration database 20 that is configured to store device configuration data associated with network devices, including the network device 14. As disclosed herein, there can be any number of one or more network devices 14, each of which can reside on the same user network or any other network (shown). The device configuration data stored in the configuration database 20 includes service configuration data 22 and user configuration data 24. The service configuration data 22 can be defined by the associated service provider and/or administrator of the associated service network, and can thus include information associated with the service network (e.g., access and/or routing information) and information regarding provisioning of the network device 14 on the service network as well as information that uniquely identifies the user network, the network device within the associated service network. Examples of some fields of service configuration data are provided below in Table I. In some examples, the service configuration data 22 can be fixed.

TABLE I

| User ID in service network |
|---|
| IP Address for upgrades |
| Login data for user/customer |
| Initial/Default Password data |
| SNMP trap destination(s) |
| Conferencing password |
| VPN configuration data (e.g., address and port) |
| Site information for user network |

The user configuration data 24 can include information that is associated with the user and the network device 14, such as including network information associated with the user network 16. To implement automatic configuration of the network device 14, the user (e.g., a customer or an administrator of the user network 16) can provide the user configuration data 24 to the configuration system 18. The configuration system 18 can store the user configuration data 24 in the configuration database 20. As an example, at least a portion of the user configuration data 24 can be provided via the portal 12, demonstrated in the example of FIG. 1 as being provided via a data flow CSTM_CNFG. For example, the user can implement the portal 12 to log-on to a remote interface (e.g., a configuration website), such as hosted at the configuration system 18 and implemented to access the configuration database 20 for entering user configuration data 24, which can include fixed user configuration data and mutable configuration data. As an example, the portal 12 can correspond to a web-browser or a wireless app that is configured to access the remote interface that can be hosted at the configuration system 18. As yet another example, the user configuration data 24 is not limited to being provided via the portal 12, but could also be provided in a variety of other ways, such as directly at configuration system 18 (e.g., via a user interface at the configuration system 18 or via a portable or hardware memory device that can be installed at the configuration system 18). For example, the mutable user configuration data can be associated with network parameters associated with the user network 16. The user can also provide fixed user configuration data, such as including parameters associated with the customer entity itself, which can also be included in the user configuration data 24. The fixed user configuration data can be provided, for example, by the user during ordering of the network device 14, such that the administrator(s) of the configuration system 18 can store the appropriate fixed user configuration data in the configuration database 20. Examples of some fields of user configuration data, including an indication of whether such data is fixed or mutable, are provided below in Table II. Other information can be provided by the user, including information can be used for configuring the network device and other information that can be maintained in the service network for other purposes.

TABLE II

| | |
|---|---|
| SUBNET - an IP address for a user cloud subnet | Fixed |
| Number of user sites | Fixed |
| IP Address number for cloud VPN subnet | Fixed |
| IP Address number for user equipment subnet | Fixed |
| IP Address for VPN tunnel subnet | Fixed |
| IP address for network device in user network | Mutable |
| ID for network device in VLAN | Mutable |
| IP address for LAN router for network device | Mutable |
| User network DSN location | Mutable |

In addition to the examples of fixed and mutable configuration data, there can be a variety of other functions and services that can be configured for operation of the network device 14 in the system 10. For example, an authorized user can employ the portal 12 to define one or more cloud services that can be accessible via the network device. In some examples, other configuration data can specify firewall settings for the user network, session border controller settings and quality of service (QoS) settings.

Subsequent to providing the user configuration data 24 to the configuration system 18, the user can couple the network device 14 to the user network 16. As described herein, "coupling" the network device 14 to the user network 16 can be used to describe establishing a communication link between the network device 14 and the user network 16 (e.g., wired or wireless), as well as powering on or rebooting the network device 14 while it is physically or wirelessly able to connect to the user network 16. In response to the coupling of the network device 14 to the user network 16, the network device 14 can establish a connection to the configuration system 18. For example, the connection can be a secure connection that is initiated as a request for configuration data from the network device 14 to the configuration system 18. Upon the configuration system 18 identifying the network device 14 in the user network 16, the configuration system 18 can implement a data transfer of the service configuration data 22 and the user configuration data 24 from the configuration database 20 to the network device 14, demonstrated in the example of FIG. 1 as a data signal SCR_CNFG between the network device 14 and the configuration system 18. The network device 14 can thus be automatically configured based on the receipt of the service configuration data 22 and the user configuration data 24 from the configuration database 20.

As an example, to establish the connection between the network device 14 and the configuration system 18, the network device 14 can be configured to initially obtain characteristics about itself and the user network 16 automatically. For example, upon being coupled to the user network 16, the network device 14 can initiate a dynamic host configuration protocol (DHCP) request on the user network 16 to obtain network identification information, such as an Internet protocol (IP) address for the network device 14. After obtaining the network identification information, the network device 14 can obtain information associated with the user network 16 via a Domain Name System (DNS) request, such as to obtain an IP address for the configuration system 18, or to translate a uniform resource locator (URL) for the configuration system 18 to the IP address for the configuration system 18.

Based on the information regarding the user network 16 and the identity of the network device 14 on the user network 16, the network device 14 can access a memory (not shown) to obtain a network address of the configuration system 18. For example, the network device 14 can be provided with information regarding a network location, such as a URL of the configuration system 18, prior to provisioning of the network device 14 to the user. The network device 14 can thus be programmed to access the network location information of the configuration system 18 and to obtain a communication link between the network device 14 and the configuration system 18 to transmit a configuration request. As an example, the communication link can be a secure connection, such as a Hypertext Transfer Protocol Secure (HTTPS) connection or a Secure Shell (SSH) tunneling protocol. The secure connection can establish a Virtual Private Network (VPN) or other secure channel between the network device 14 and the configuration system 18, such as by authenticating the network device 14 with respect to the configuration system 18. For example, the user can provide VPN subnet and other site specific information with the configuration request via the portal 12 to enable authentication of the network device 14 with respect to the configuration system 18, which information can be provided before or after coupling the network device 14 to the user network 16. In response to authentication of the network device 14, the configuration system 18 can initiate a data transfer of the device configuration data (e.g., the service configuration data 22 and the user configuration data 24) from the configuration database 20 to the network device 14 for configuration of the network device 14. For example, the network device 14 can function as desired on the user network 16 based on the automatic configuration, such as after a self-initiated reboot.

As a further example, the network device 14 can be a network router (e.g., a cloud access router (CAR)), such that the configuration of the network device 14 establishes a VPN connection between the user network 16 and a cloud network (e.g., the service network). In some examples, the user network can be implemented as telecommunications system that includes a private branch exchange (PBX) system. For example, after receiving the device configuration data, the network device 14 can receive premise PBX configuration data from the user network 16, such as a PBX server. Accordingly, the network device 14 can then operate in both the user network 16 and the service network (e.g., cloud network). For example, the PBX configuration data can include a description of all devices (e.g., telephones, switches, video conferencing systems, conference bridges, routers and the like), applications and/or services connected to and operating in the user network. The CAR can further access services and devices implemented in the cloud or otherwise provided by the provider of the service network.

In addition to the automatic configuration of the network device 14 responsive to connecting the network device 14 to the user network 16, the network device 14 can be automatically configured in response to network changes and/or configuration updates. For example, the user can provide configuration updates to the configuration system 18 via the portal 12, such as via the configuration website, to update configuration parameters of the network device 14. The configuration updates can be stored as part of the user configuration data 24 in the configuration database 20. In response to receiving the configuration updates and at a predetermined time (e.g., specified by the user), the configuration system 18 can provide an update message to the network device 14 over the secure connection. The network device 14 can thus re-initiate an automatic configuration procedure in response to the configuration update request. For example, the network device 14 can be set from configured state to an unconfigured state in response to determining a change in configuration information in the configuration system 18. In response to entering the unconfigured state, the network device 14 can access the location information associated with the configuration system 18 and send an update request to the configuration system (e.g., via a secure communication link). The configuration system 18 can provide a response that includes the device configuration data (e.g., the service configuration data 22 and the user configuration data 24) for configuring the network device 14. As another example, the network device 14 can access the location information associated with the configuration system 18 (e.g., a URL associated with the configuration system 18) to request only the updated data. The configuration system 18 can, in response, transmit only a portion of the user configuration data 24 from the configuration database 20 to the network device 14, such as only the mutable user configuration data or that portion which had been changed. As yet another example, the configuration system 18 can, in response to receiving updated device configuration data, can establish a connection to the network device 14 and automatically transmit the updated device configuration data to the network device 14.

As yet a further example, the network device 14 can be configured to continuously poll the user network 16 or the service network to ensure that the parameters associated with the user network 16 and/or the network device 14 are consistent with the configuration and/or current. The polling data can be transmitted by the network device 14 periodically at each of predetermined intervals (e.g., 60 seconds) or intermittently in response to an event. As an example, the network device 14 can poll the service network to determine if a VPN connection to the service network is still operational. In response to the network device 14 receiving a negative acknowledgement to the polling data, such as to indicate a configuration change to the user network 16 and/or the service network, the network device 14 can be set to its unconfigured state. As another example, the polling data can include an indicator associated with the configuration of the network device 14 (e.g., a configuration sequence identifier, such as included in a cookie), such that the configuration system 18 can provide the acknowledgement to indicate that the configuration of the network device 14 is not current. As a result, the network device 14 can enter the unconfigured state.

The network device 14 can attempt to re-establish a connection one or more times at predetermined intervals before being set to the unconfigured state. For example, during the initial configuration of the network device 14, a device authentication identifier (e.g., an authentication cookie) can be generated for the network device 14. Thus, the network device 14 can attempt to establish a connection with the configuration system 18 using the device authentication identifier, such as with the polling data, to re-establish the connection before being set to the unconfigured state, and/or with the configuration request. In response to a lack of connectivity with the configuration system 18, or in response to a message from the configuration system 18 indicating that the device authentication identifier is not recognized by the configuration system, the network device 14 can re-transmit the data (e.g., polling data or configuration request) without the device authentication identifier. In the absence of the device authentication identifier, the configuration system 18 can treat the network device 14 as an unconfigured or new device, such as to initiate an automatic configuration procedure, as disclosed herein.

For example, in response to being set to the unconfigured state, the network device 14 can access the location information associated with the configuration system 18 (e.g., a URL associated with the configuration system 18) and issue a request to a predetermined address for device configuration data, including the service configuration data 22 and the user configuration data 24. For example, changes associated with the user network 16 and/or the service network may not have been propagated to the network device 14, such that the configuration database 20 may include the proper configuration data that has yet to be provided to the network device 14. Accordingly, upon the network device 14 determining that the configuration parameters associated with the user network 16 and/or the service network have changed, the network device 14 can attempt an automatic configuration, as disclosed herein.

Figure 2:
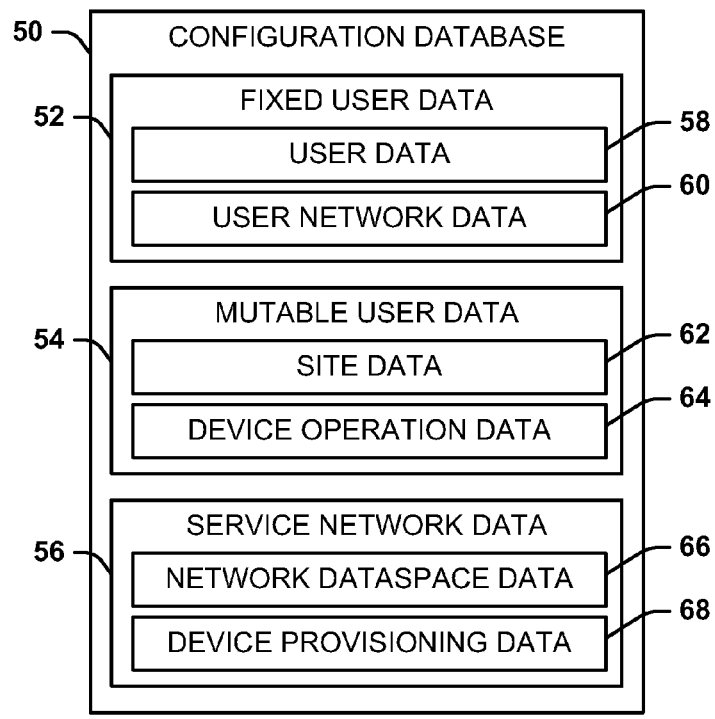
FIG. 2 illustrates an example of a configuration database.

FIG. 2 illustrates an example of a configuration database 50. The configuration database 50 can correspond to the configuration database 20 in the example of FIG. 1. Therefore, reference can to be made to the example of FIG. 1 in the following description of the example of FIG. 2 for additional context.

The configuration database 50 includes fixed user configuration data 52, mutable user configuration data 54, and service network data 56 (see, e.g., Tables I and II herein). The fixed user configuration data 52 includes user data 58 and user network data 60. As an example, the user data 58 can include parameters associated with the customer (e.g., identification codes, subscription information, etc.). As another example, the user network data 60 can include fixed parameters associated with the user network 16, such as a deployment type and subnet data pertaining to a customer cloud network, a VPN, and/or sites in the user network 16. The user data 58 can be provided, for example, upon a purchase or ordering stage associated with the network device 14.

The mutable user configuration data 54 includes site data 62 and device operation data 64. As an example, the site data 62 can include data associated with the user network 16, such as including network addresses associated with the network device 14 and/or other components on the user network 16 (e.g., one or more servers). As another example, the device operation data 64 can include parameters associated with the desired operation of the network device 14. In the example of the network device 14 being configured as a CAR, the device operation data 64 can include routing information (e.g., including a default routing parameter). The mutable user configuration data 54 can be provided by the customer or a user via a configuration website, such as hosted at the configuration system 18. For example, the user can log-in to the configuration website to access and/or modify the mutable user configuration data 54, and can authenticate the network device 14 for initiation of the transfer of the configuration data in the configuration database 50 to the network device 14 over the secure connection.

The service network data 56 includes network dataspace data 66 and device provisioning data 68. As an example, the network dataspace data 66 can include details regarding the service network, such as maintained by a service provider and/or administrator of the configuration system 18. For example, the network dataspace data 66 can include network addresses associated with one or more components on the service network with which the network device 14 and/or other devices on the user network 16 are intended to communicate. As another example, the device provisioning data 68 can include information regarding identification of the network device 14 and/or the user network 16 by the service network. For example, the service network data 56 can be generated by the service provider and saved in the configuration database 50 previous to the order of and provisioning of the network device 14 and can be in part saved in the configuration database 50 at such time, such as at a time when the customer/user establishes a relationship with the service provider. The relationship, for example, can include purchase of cloud services that can be provided any number of customers (e.g., subscribers).

Figure 3:
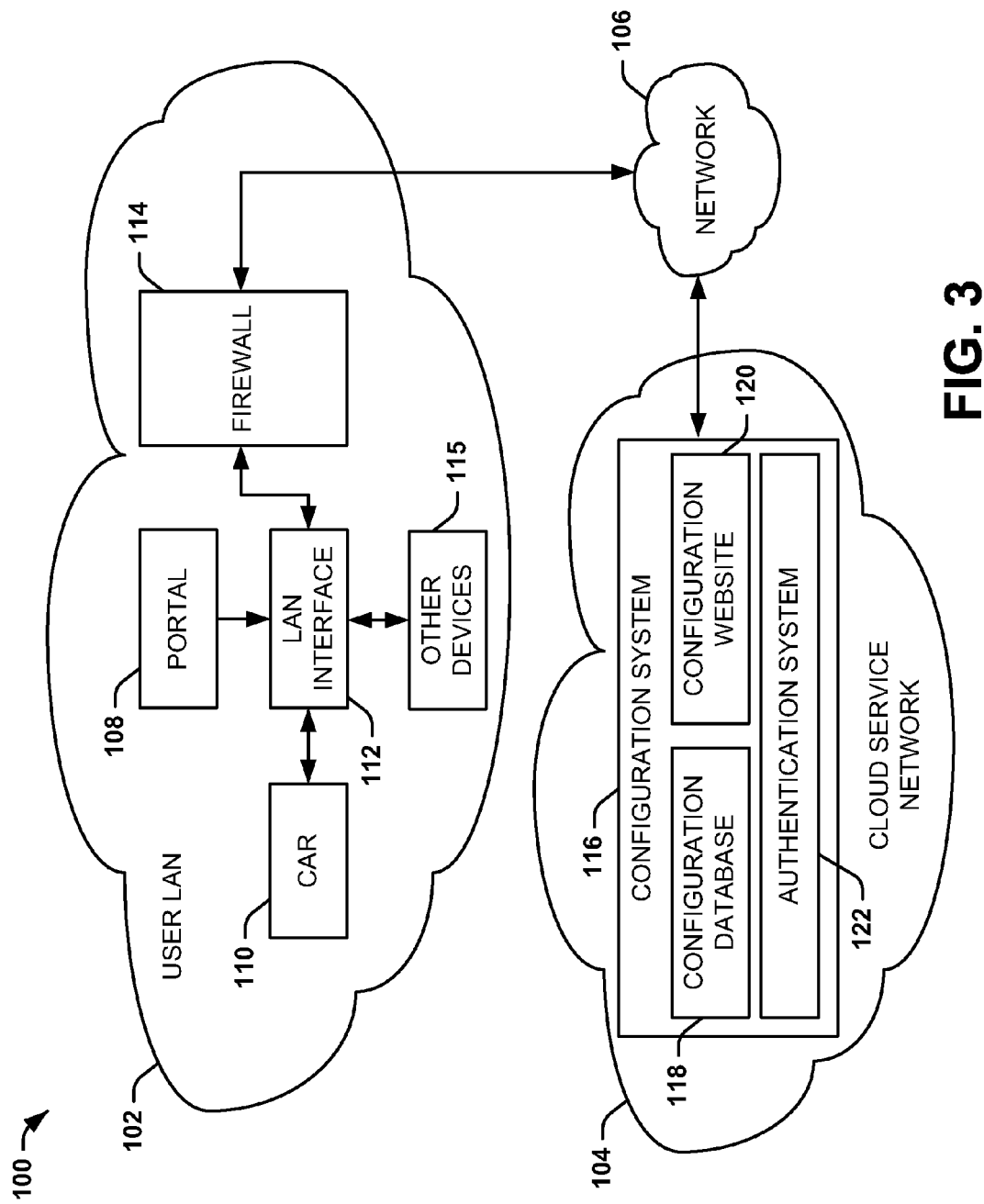
FIG. 3 illustrates an example of a cloud network system.

FIG. 3 illustrates an example of a cloud network system 100. In the example of FIG. 3, the cloud network system 100 includes a user LAN 102 that can correspond to a user network, and a cloud service network 104 that can correspond to a service network. The user LAN 102 and the cloud service network 104 are communicatively coupled via a network, such as can include the Internet 106 and/or other public or private networks.

The user LAN 102 includes a portal 108 and a cloud access router (CAR) 110 that can be a headless network device that is to be installed on the user LAN 102. The portal 108 can correspond to a computer system (e.g., an enterprise server or personal computer) that includes a user interface (e.g., a graphical user interface (GUI)). While the portal 108 is demonstrated as residing in the user LAN 102, it is to be understood that the portal 108 can be located at and coupled to another network, such as can access the user LAN 102. The portal 108 and the CAR 110 are coupled to a LAN interface 112 that is configured to access the Internet 106 through a firewall 114. In addition, the user LAN 102 can include one or more other devices 115 that are configured to operate in the user LAN 102. In some examples, the other devices 115 can include a PBX system, other routers, switches or the like for collectively operating in a user telecommunications system.

The cloud service network 104 includes a configuration system 116. As an example, the configuration system 116 can be configured as a set of one or more cloud network system servers that are resident on the cloud service network 104. The configuration system 116 includes a configuration database 118 that is configured to store device configuration data associated with network devices, including the CAR 110. The device configuration data stored in the configuration database 118 can include service configuration data and user configuration data. For example, the service configuration data can correspond to the service configuration data 56 in the example of FIG. 2. The user configuration data can include fixed user configuration data and mutable user configuration data, such as the fixed user configuration data 52 and the mutable user configuration data 54, respectively, in the example of FIG. 2.

To implement automatic configuration of the CAR 110, the user (e.g., a customer or an administrator of the user LAN 102) can provide the user configuration data to the configuration system 116, such that the configuration system 116 can store the user configuration data in the configuration database 118. As an example, at least a portion of the user configuration data can be provided via the portal 108. For example, the user can utilize the portal 108 to log-on to a configuration website 120, demonstrated in the example of FIG. 3 as being hosted on the configuration system 116, to enter mutable user configuration data (e.g., the mutable user configuration data 54 in the example of FIG. 2). The user can also employ the portal 108 to provide fixed user configuration data, such as during ordering of the CAR 110. The administrator(s) of the configuration system 116 (e.g., the cloud service provider) can store the appropriate user configuration data in the configuration database 118.

Subsequent to providing the user configuration data to the configuration system 116, the user can couple the CAR 110 to the user LAN 102. In response to the coupling of the CAR 110 to the user LAN 102, the CAR 110 can establish a connection to the configuration system 116 via the Internet 106. For example, the connection can be a secure connection that is initiated as a request for configuration data from the CAR 110 to the configuration system 116.

To establish the secure connection between the CAR 110 and the configuration system 116, the CAR 110 can be configured to initially obtain characteristics about itself and the user LAN 102 automatically. For example, upon being coupled to the user LAN 102, the CAR 110 can initiate a DHCP request on the user LAN 102 to obtain network identification information, such as an IP address for the CAR 110. Upon obtaining the network identification information, the CAR 110 can obtain information associated with the user LAN 102 via a DNS request, such as to obtain an IP address of the configuration system 116. Upon establishing the information regarding the user LAN 102 and the identity of the CAR 110 on the user LAN 102, the CAR 110 can access a memory (not shown) to obtain a network address of the configuration system 116. For example, the CAR 110 can be provided with information regarding a network location, such as a URL, of the configuration system 116 prior to provisioning of the CAR 110. The CAR 110 can thus be programmed to access the network location information of the configuration system 116 and to obtain a communication link (e.g., a secure communications link) between the CAR 110 and the configuration system 116. As an example, the communication link can be a secure connection, such as an HTTPS connection, SSH tunnel or VPN.

In the example of FIG. 3, the configuration system 116 can include an authentication system 122 that is configured to verify the CAR 110 before providing the configuration data to the CAR 110. For example, after connecting to the configuration system 116, the CAR 110 can send identifying data to the configuration system (e.g., via the secure connection). The CAR identifying data can include a Media Access Control (MAC) address, data identifying a time when the CAR was activated (e.g., turned ON), an IP address of the CAR in the user network (e.g., as provided by the DHCP server) or an combination of this or other data that may individually or collectively help to uniquely identify the CAR. In response to receiving the identifying data from the network device via the secure connection, the authentication system can send an authentication request based on the identifying data. The authentication request can be provided via the portal or sent as a message (e.g., an email or other message delivery format), such as that provides a link and/or instructions to access the portal. The authentication request can include each element of data in the identifying data from the CAR 110 or otherwise represent all or a portion of the identifying data. An authorized user can access the authentication system 122 by logging-in to the configuration website 120 (e.g., via the portal 108) and providing a verification user input response. For instance, the verification user input response can verify that one or more (e.g., in some cases each) of the unique identifying data for the CAR 110 is valid. In some examples, the portal 108 can provide an 'Approve' button or other GUI element that an authorized user can click to confirm operation of the CAR 110. A verification user input response can be made via other mechanisms, such as responding to the message in a prescribed manner, confirming manually via a telephone call or the like. The authentication system 122 can validate operation of the CAR 110 based on the verifying user input response to the authentication request. Once verified and approved for operation, the configuration system 116 can initiate a data transfer of the device configuration data from the configuration database 118 to the CAR 110 for automated configuration of the CAR 110. By including a process for verification of the CAR 110 by an authorized user, the configuration system can mitigate spoofing of other devices that might connect to the configuration system for other purposes.

The CAR 110 can employ the device configuration data based on the automatic configuration, such as to operate, such as after a self-initiated reboot. In addition, after receiving the device configuration data, the CAR 110 can receive premise PBX configuration data, such as from one or more of the other devices 115. Accordingly, the CAR 110 can then operate both in the user LAN 102 (e.g., for routing calls in telecommunications system) and in the cloud service network 104 via the VPN connection.

In addition to the automatic configuration of the CAR 110 upon coupling the CAR 110 to the user LAN 102, the CAR 110 can be automatically configured in response to network changes and/or configuration updates. For example, the user can provide configuration updates on the configuration system 116 via the portal 108, such as via the configuration website 120, to update configuration parameters of the CAR 110. The configuration updates can be stored as part of the user configuration data (e.g., the mutable user configuration data) in the configuration database 118. In response to receiving the configuration updates, the configuration system 116 can provide an update message to the CAR 110 over the secure connection at a predetermined time (e.g., specified by the user). The CAR 110 can thus re-initiate an automatic configuration procedure in response to the configuration update request. For example, the CAR 110 can be set to an unconfigured state, such that the CAR 110 can access the location information associated with the configuration system 116 (e.g., a URL associated with the configuration system 116) to request transmission of the configuration data (e.g., the mutable user configuration data) from the configuration database 118 to the CAR 110.

As another example, the configured CAR 110 can be configured to continuously poll the user LAN 102 or the cloud service network 104 to ensure connection of the VPN between the user LAN 102 and the cloud service network 104. The polling data can be transmitted by the CAR 110 at a predetermined interval (e.g., every 60 seconds). In response to the CAR 110 not receiving a proper acknowledgement to the polling data, such as to indicate a configuration change to the user LAN 102 and/or the cloud service network 104, the CAR 110 can be set to an unconfigured state. For example, the CAR 110 can attempt to re-establish a connection one or more times at predetermined intervals before entering the unconfigured state. In response to being set to the unconfigured state, the CAR 110 can access the location information associated with the configuration system 116 (e.g., a URL associated with the configuration system 116) to request transmission of the configuration data from the configuration database 118 to the CAR 110. For example, changes associated with the user LAN 102 and/or the cloud service network 104 may not have been propagated to the CAR 110, such that the configuration database 118 may include the proper configuration data that has yet to be provided to the CAR 110. Accordingly, upon the CAR 110 determining that the configuration parameters associated with the user LAN 102 and/or the cloud service network 104 have changed, the CAR 110 can attempt an automatic configuration, as described herein.

A configured CAR 110 thus can be utilized to access securely cloud services provided in the cloud service network 104. The cloud service network can provide cloud resources, such as video conferencing, conferencing bridges, voice mail or the like. By employing the secure connection via the CAR 110, for example, any number of one or more customers can utilize such cloud services as needed. Thus the provider of the cloud services can add, remove and/or update the services seamlessly according to customer needs, and any necessary configuration updates, service network side or from the user itself, can be propagated to the CAR 110.

Figure 4:
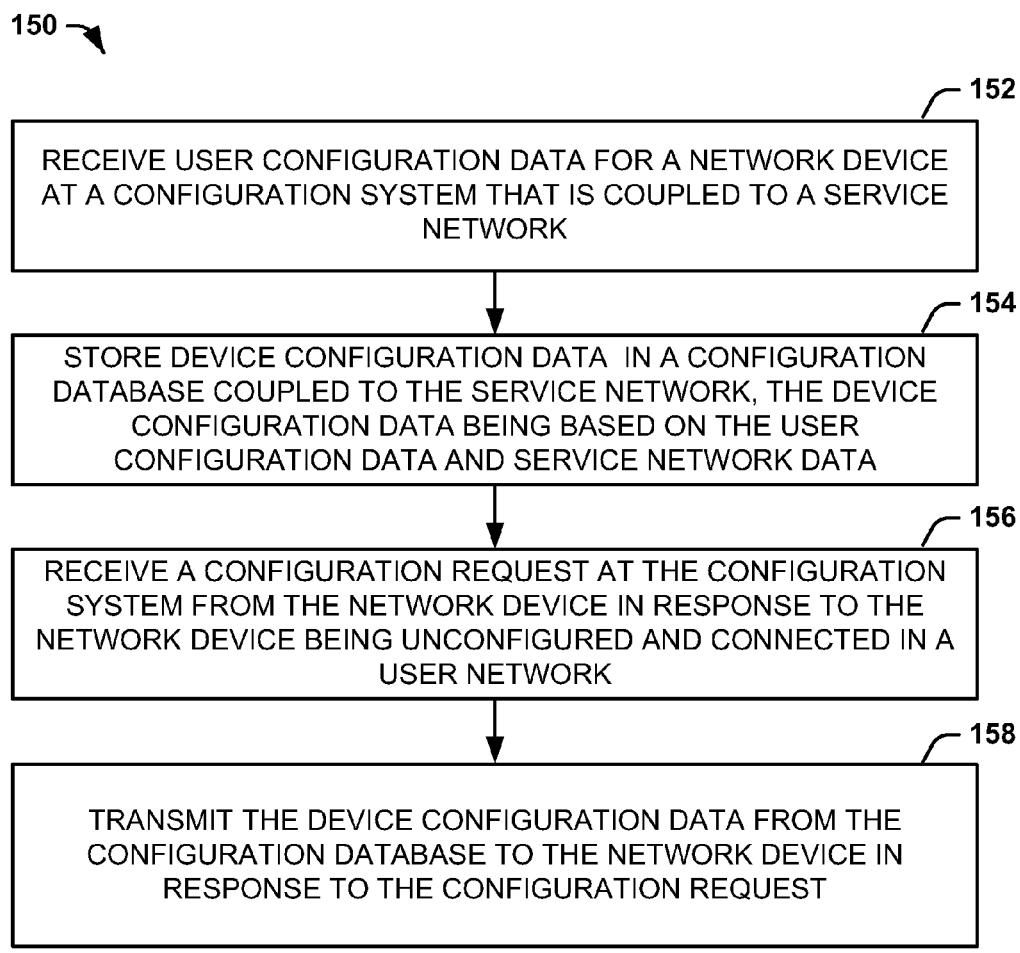
FIG. 4 illustrates an example of a method for automatically configuring a network device.
Figure 5:
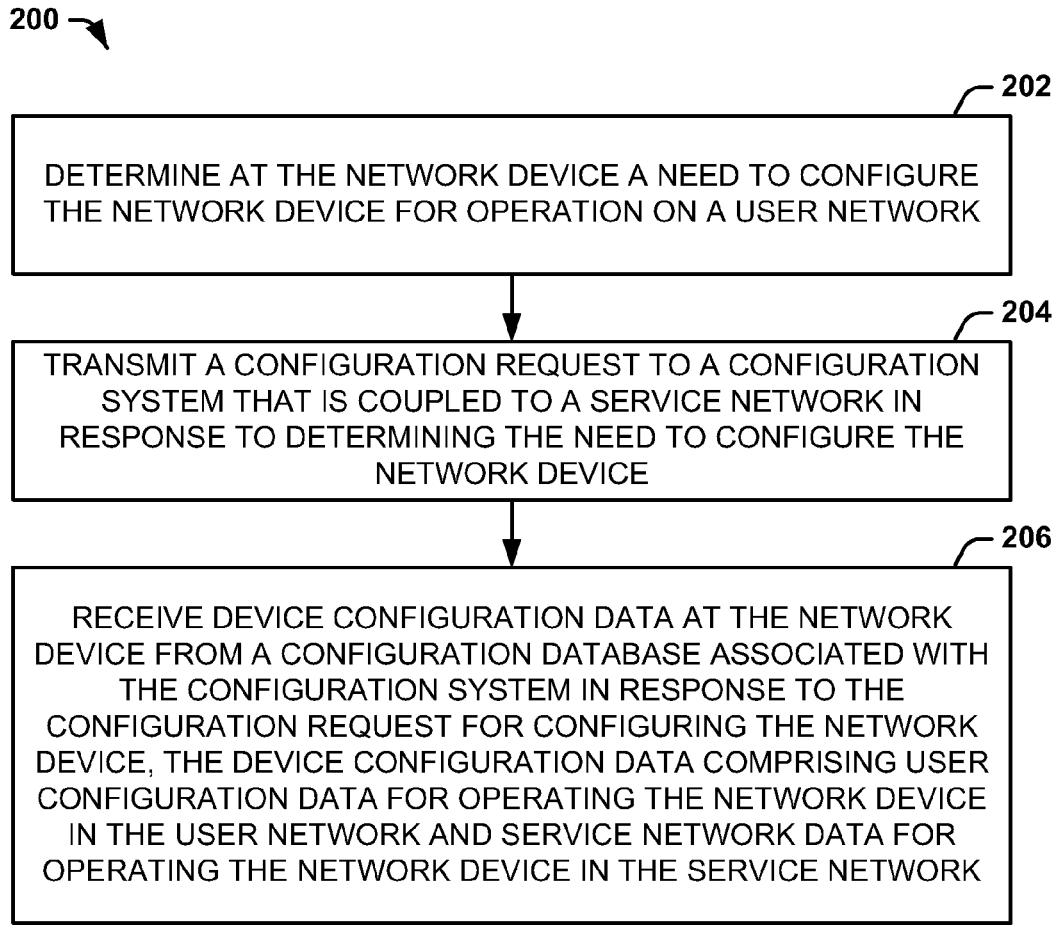
FIG. 5 illustrates another example of a method for automatically configuring a network device.

In view of the foregoing structural and functional features described above, a methodology in accordance with various aspects of the present invention will be better appreciated with reference to FIGS. 4 and 5. While, for purposes of simplicity of explanation, the methodologies of FIGS. 4 and 5 are shown and described as executing serially, it is to be understood and appreciated that the present invention is not limited by the illustrated orders, as some aspects could, in accordance with the present invention, occur in different orders and/or concurrently with other aspects from that shown and described herein. Moreover, not all illustrated features may be required to implement a methodology in accordance with an aspect of the present invention. The methods of FIGS. 4 and 5 can be implemented as instructions stored in a non-transitory computer-readable medium. The instructions can be accessed by a processor and executed to perform the methods disclosed herein.

FIG. 4 illustrates an example of a method 150 for automatically configuring a network device. At 152, user configuration data (e.g., the fixed user configuration data 52 and the mutable user configuration data 54) for a network device (e.g., the network device 14) is received at a configuration system (e.g., the configuration system 20) that is coupled to a service network (e.g., the service cloud network 104). At 154, device configuration data (e.g., the service configuration data 22 and the user configuration data 24) in a configuration database (e.g., the configuration database 20) coupled to the service network, the device configuration data being based on the user configuration data and service network data. At 156, receiving a configuration request at the configuration system from the network device in response to the network device being unconfigured and connected in a user network (e.g., the user network 16). At 158, transmitting the device configuration data from the configuration database to the network device in response to the configuration request.

FIG. 5 illustrates an example of a method 200 for automatically configuring a network device. At 202, determining at the network device (e.g., the network device 14) a need to configure the network device for operation on a user network (e.g., the user network 16). At 204, transmitting a configuration request to a configuration system (e.g., the configuration system 18) that is coupled to a service network (e.g., the service cloud network 104) in response to determining the need to configure the network device. At 206, receiving device configuration data (e.g., the service configuration data 22 and the user configuration data 24) at the network device from a configuration database (e.g., the configuration database 20) associated with the configuration system in response to the configuration request for configuring the network device, the device configuration data comprising user configuration data (e.g., the fixed user configuration data 52 and the mutable user configuration data 54) for operating the network device in the user network and service network data (e.g., the service network data 56) for operating the network device in the service network.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory computer readable medium having instructions executable by a processor to implement a method, the method comprising:
   receiving user configuration data for a cloud access router (CAR) at a configuration system that is coupled to a cloud network;
   storing device configuration data in a configuration database coupled to the cloud network, the device configuration data being based on the user configuration data and cloud network data;

receiving a configuration request at the configuration system from the CAR, the configuration request being provided by the CAR automatically in response to the CAR being unconfigured for operation in the cloud network and connected in a user network; and transmitting the device configuration data from the configuration database to the CAR in response to the configuration request, the configuration data programmed to provision the CAR on the cloud network to establish a virtual private network (VPN) connection between the user network and the cloud network for accessing at least one cloud service hosted on the cloud network from the user network via the CAR.

2. The medium of claim 1, wherein receiving the user configuration data comprises receiving the user configuration data that is provided via at least one user via a portal configured to access the configuration database.

3. The medium of claim 2, wherein receiving the user configuration data comprises allowing access to a remote interface associated with the configuration database, the remote interface being hosted on the configuration system to input the user configuration data via the portal.

4. The medium of claim 1, wherein receiving the user configuration data comprises:
receiving fixed user configuration data according to user specifications;
receiving mutable user configuration data that includes parameters for identifying at least one of a resource in the user network and device operation data associated with the CAR; and
storing the fixed user configuration data and the mutable user configuration data on the configuration database.

5. The medium of claim 4, further comprising:
receiving at least one update to the mutable user configuration data in response to a user input;
storing the at least one update on the configuration database;
transmitting an update message to the CAR in response to the at least one update;
receiving the configuration request at the configuration system from the CAR in response to the CAR receiving the update message; and
transmitting the device configuration data, including the at least one update, from the configuration database to the CAR in response to the configuration request for updating the CAR.

6. The medium of claim 1, further comprising:
periodically receiving polling data from the CAR at the configuration system;
transmitting an acknowledgement to the CAR in response to the polling data;
receiving the configuration request from the CAR indicating a failure to receive the acknowledgement by the CAR; and
transmitting the device configuration data from the configuration database to the CAR in response to the configuration request for updating the CAR.

7. The medium of claim 1, further comprising:
periodically receiving polling data from the CAR at the configuration system;
analyzing the polling data to determine if a configuration of the CAR is current;
transmitting an acknowledgement to the CAR in response to a determination that the configuration of the CAR is not current;
receiving the configuration request from the CAR in response to the acknowledgement; and transmitting the device configuration data from the configuration database to the CAR in response to the configuration request for updating the CAR.

8. The medium of claim 1, wherein receiving the configuration request comprises receiving the configuration request via a secure connection between the configuration system and the CAR in response to the CAR being coupled to the user network, and
wherein transmitting the device configuration data further comprises transmitting the device configuration data from the configuration database to the CAR via the secure connection in response to the configuration request.

9. The medium of claim 8, further comprising:
establishing the secure connection between the CAR and the configuration system;
receiving identifying data from the CAR via the secure connection;
sending an authentication request based on the identifying data for approval by an authorized user input associated with the CAR; and
validating operation of the CAR based on a verifying user input response to the authentication request to enable transmission of the configuration data from the configuration database.

10. A non-transitory computer readable medium having instructions executable by a processor to implement a method for automatically configuring a cloud access router (CAR), the method comprising:
determining at the CAR a need to configure the CAR for operation on a user network absent a user input;
automatically transmitting a configuration request to a configuration system that is coupled to a cloud network in response to the determination of the need to configure the CAR in the cloud network absent the user input; and
receiving device configuration data at the CAR from a configuration database associated with the configuration system in response to the configuration request for configuring the CAR, the device configuration data comprising user configuration data for operating the CAR in the user network and cloud network data for operating the CAR in the cloud network, such that the CAR employs the cloud network data to establish a virtual private network (VPN) connection between the user network and the cloud network to access at least one cloud service hosted on the cloud network from the user network via the CAR.

11. The medium of claim 10, wherein the user configuration data comprises at least one of: network address data associated with the CAR, network address data associated with at least one additional device on the user network, and parameters associated with a desired operation of the CAR.

12. The medium of claim 11, further comprising:
establishing a secure connection between the CAR and the configuration database; and
transmitting identifying data to the configuration system via the secure connection;
wherein transmitting the configuration request comprises transmitting the configuration request via the secure connection to the configuration system; and
wherein receiving the device configuration data comprises receiving the device configuration data from the configuration database at the CAR via the secure connection in response to a verifying user input response that is provided via a portal responsive to an authentication request transmitted from the configuration system to the portal based on the identifying data.

13. The medium of claim 10, wherein the user configuration data comprises:
fixed user configuration data according to user specifications for the user network; and
mutable user configuration data associated with at least one of a site in the user network and device operation data associated with the CAR.

14. The medium of claim 13, wherein the mutable user configuration data further comprises at least two of a password to enable operation of the CAR in the user network, network address data for the CAR in the user network, and network address data for locating at least one predetermined service in the user network.

15. The medium of claim 10, further comprising:
receiving an update message at the CAR based on the user configuration data being updated at the configuration database;
transmitting the configuration request to the configuration system from the CAR in response to receiving the update message; and
receiving the cloud network data and updated user configuration data from the configuration database at the CAR.

16. The medium of claim 10, further comprising:
periodically transmitting polling data to the configuration system;
receiving an acknowledgement from the configuration system indicating that a configuration of the CAR is not current;
transmitting the configuration request to the configuration system from the CAR in response to receiving the acknowledgement, the configuration request including a device authentication identifier generated during the configuration of the CAR;
re-transmitting the configuration request without the device authentication identifier in response to being unable to connect with the configuration system; and
receiving the cloud network data and updated user configuration data from the configuration database at the CAR.

17. A non-transitory computer readable medium having instructions executable by a processor to implement a method for automatically configuring a network device, the method comprising:
determining at the network device a need to configure the network device for operation on a user network;
transmitting a configuration request to a configuration system that is coupled to a service network in response to determining the need to configure the network device;
receiving device configuration data at the network device from a configuration database associated with the configuration system in response to the configuration request for configuring the network device, the device configuration data comprising user configuration data for operating the network device in the user network and service network data for operating the network device in the service network;
periodically transmitting polling data from the network device to the configuration system;
receiving one of an acknowledgement and a negative response at the network device in response to the polling data;
setting the network device to an unconfigured state in response to receiving one of the negative response and no response after a predetermined amount of time;
transmitting the configuration request to the configuration system from the network device in response to being set to the unconfigured state;
receiving the device configuration data from the configuration database at the network device in response to the configuration request; and
setting the network device to a configured state in response to configuring the network device based on the received device configuration data.

18. The medium of claim 10, further comprising:
periodically monitoring network conditions associated with the user network at the CAR;
setting the CAR to an unconfigured state in response to detecting a change in the network conditions associated with the user network;
transmitting the configuration request to the configuration system from the CAR in response to being set to the unconfigured state; and
receiving the device configuration data from the configuration database at the CAR.

19. The medium of claim 10, further comprising:
initiating a dynamic host configuration protocol (DHCP) request in response to activating the CAR on the user network;
accessing, from memory of the CAR, a resource location in the cloud network corresponding to the configuration system; and
establishing a network connection between the configuration system and the CAR based on the resource location.

20. A network system comprising:
a headless cloud access router (CAR) that is coupled to a user local area network (LAN); and
a configuration system coupled to a cloud network, the configuration system comprising a configuration database configured to store device configuration data for each of a plurality of network devices including the headless CAR, the device configuration data for the headless CAR including user configuration data for the headless CAR that is provided in response to an authorized user input associated with the user LAN, and cloud network data for operating the headless CAR in the cloud network, the configuration system being further configured to transmit the device configuration data from the configuration database to the headless CAR for configuring the headless CAR automatically in response to a configuration request that is automatically provided from the headless CAR upon the headless CAR being in an unconfigured state while coupled to the user LAN to provision the CAR on the cloud network to establish a virtual private network (VPN) connection between the user network and the cloud network to provide for access of at least one cloud service hosted on the cloud network from the user network via the CAR.

21. The network system of claim 20, wherein the user configuration data comprises fixed user configuration data associated with customer specifications and mutable user configuration data associated with at least one of a site in the user LAN and device operation data associated with the headless CAR, and wherein the configuration system is further configured to transmit an update message to the headless CAR in response to receiving updates to the mutable user configuration data through a website that is accessed via a portal.

22. The network system of claim 21, wherein the portal comprises a user interface configured to access a remote interface for accessing the configuration database that is hosted on the configuration system to input the user configuration data via the portal.

23. The network system of claim 20, wherein the configuration system is further configured to establish a secure connection between the configuration system and the headless CAR, and wherein the headless CAR is configured to transmit identifying data to the configuration system via the secure connection in response to being coupled to the user LAN in the unconfigured state, wherein the configuration system is configured to transmit an authentication request to a user via a portal, and wherein the configuration system is configured to transmit the device configuration data from the configuration database via the secure connection in response to the authorized user input that is provided based on the authentication request.

24. A non-transitory computer readable medium having instructions executable by a processor to implement a method, the method comprising:

receiving user configuration data for a network device at a configuration system;

storing device configuration data in a configuration database coupled to the service network, the device configuration data being based on the user configuration data and service network data;

establishing a secure connection between a network device and a configuration system that is coupled to a service network;

receiving a configuration request at the configuration system from the network device via the secure connection in response to the network device being unconfigured and connected in a user network;

receiving identifying data from the network device via the secure connection;

sending an authentication request based on the identifying data for approval by an authorized user input associated with the network device;

validating operation of the network device based on a verifying user input response to the authentication request; and transmitting the device configuration data from the configuration database to the network device via the secure connection in response to the configuration request and the verifying user input response.

\* \* \* \* \*